US009233369B2

(12) United States Patent
Malik et al.

(10) Patent No.: US 9,233,369 B2
(45) Date of Patent: Jan. 12, 2016

(54) FLUIDIC DEVICES AND FABRICATION METHODS FOR MICROFLUIDICS (75) Inventors: Imran R. Malik, Pasadena, CA (US); Axel Scherer, Woodstock, VT (US)

(73) Assignee: CALIFORNIA INSTITUTE OF TECHNOLOGY, Pasadena, CA (US)

( * ) Notice: Subject to any disclaimer, the term of this patent is extended or adjusted under 35 U.S.C. 154(b) by 883 days.

(21) Appl. No.: 13/336,717

(22) Filed: Dec. 23, 2011

(65) Prior Publication Data

US 2012/0180882 A1 Jul. 19, 2012

Related U.S. Application Data (60) Provisional application No. 61/426,664, filed on Dec. 23, 2010.

(51) Int. Cl.
*B29C 65/00* (2006.01)
*B32B 37/00* (2006.01)
(Continued)

(52) U.S. Cl.
CPC .............. *B01L 3/502707* (2013.01); *B01L 7/52* (2013.01); *B01L 2200/027* (2013.01);
(Continued)

(58) Field of Classification Search
CPC ...... B29C 65/00; B29C 65/48; B29C 65/486; B29C 65/50; B29C 65/5057; B29C 65/5064; B29C 65/5078; B29C 65/5085; B29C 2793/0018; B29C 2793/0045; B32B 3/00; B32B 3/02; B32B 3/26; B32B 3/266; B32B 3/30
USPC ............... 156/60, 64, 99, 196, 219, 230, 235, 156/242, 245, 246, 247, 249, 292, 297, 299, 156/300, 306.6, 307.1, 250, 252, 256, 264, 156/265, 267; 137/561 R, 1, 15.01, 803, 137/814, 833
See application file for complete search history.

(56) References Cited

U.S. PATENT DOCUMENTS 4,281,708 A    8/1981   Wing et al.
4,930,361 A    6/1990   Nimberger
(Continued)

FOREIGN PATENT DOCUMENTS

EP          1972919       9/2008
JP       2002-139418     5/2002
(Continued)

OTHER PUBLICATIONS

PCT Written Opinion mailed on Oct. 16, 2013 for PCT Application PCT/US2013/051461 filed on Jul. 2013 in the name of California Institute of Technology.
(Continued)

*Primary Examiner* — Philip Tucker
*Assistant Examiner* — Brian R Slawski
(74) *Attorney, Agent, or Firm* — Steinfl & Bruno LLP (57) ABSTRACT A method of fabricating a fluidic device comprises providing a fluidic device including a body having a surface and one or more channels located in the body. Recesses are defined on said surface. The one or more channels can have respective boundaries. A layer of adhesive including one or more panel-shaped pieces having a pattern based on the pattern of boundaries of the channels can be formed and applied on the surface of the body. It is further controlled that the layer of adhesive has respective boundaries surrounding the boundaries of the one or more channels.

6 Claims, 6 Drawing Sheets (51) Int. Cl.
  *B32B 38/04* (2006.01)
  *B08B 7/00* (2006.01)
  *B08B 9/02* (2006.01)
  *E03B 1/00* (2006.01)
  *F17D 3/00* (2006.01)
  *F03B 11/02* (2006.01)
  *F15B 13/00* (2006.01)
  *F16L 3/01* (2006.01)
  *F15C 1/06* (2006.01)
  *B01L 3/00* (2006.01)
  *B01L 7/00* (2006.01)
  *B29C 65/48* (2006.01)
  *B32B 3/02* (2006.01)
  *B32B 3/30* (2006.01)

(52) U.S. Cl.
  CPC ..... *B01L 2200/04* (2013.01); *B01L 2200/0689* (2013.01); *B01L 2300/0877* (2013.01); *B29C 65/486* (2013.01); *B32B 3/02* (2013.01); *B32B 3/30* (2013.01); *Y10T 137/8593* (2015.04)

(56) References Cited

U.S. PATENT DOCUMENTS

| | | | |
|---|---|---|---|
| 5,196,830 | A | 3/1993 | Birging |
| 5,272,518 | A | 12/1993 | Vincent |
| 5,508,197 | A | 4/1996 | Hansen et al. |
| 5,820,265 | A | 10/1998 | Kleinerman |
| 5,871,699 | A | 2/1999 | Ruggeri |
| 6,222,619 | B1 | 4/2001 | Herron et al. |
| 6,441,890 | B2 | 8/2002 | Wardlaw |
| 6,544,734 | B1 | 4/2003 | Briscoe et al. |
| 6,623,696 | B1 | 9/2003 | Kim et al. |
| 6,902,112 | B2 | 6/2005 | Sadler et al. |
| 7,241,421 | B2 | 7/2007 | Webster et al. |
| 7,411,792 | B2 | 8/2008 | Richards et al. |
| 7,564,541 | B2 | 7/2009 | Tuschel |
| 7,754,153 | B2 | 7/2010 | Miyamoto |
| 8,058,054 | B2 | 11/2011 | Owen et al. |
| 8,071,385 | B2 | 12/2011 | Haas et al. |
| 8,277,760 | B2 | 10/2012 | Lehto |
| 8,395,773 | B2 | 3/2013 | Malik et al. |
| 2002/0046614 | A1 | 4/2002 | Alley |
| 2002/0160534 | A1 | 10/2002 | Herron et al. |
| 2003/0064507 | A1 | 4/2003 | Gallagher et al. |
| 2003/0109806 | A1 | 6/2003 | Weber et al. |
| 2004/0022677 | A1 | 2/2004 | Wohlstadter et al. |
| 2004/0091862 | A1 | 5/2004 | Brandenburg et al. |
| 2004/0152206 | A1 | 8/2004 | Davis et al. |
| 2005/0024636 | A1 | 2/2005 | Nakamura |
| 2005/0036142 | A1 | 2/2005 | Oldham et al. |
| 2005/0042651 | A1 | 2/2005 | Vann et al. |
| 2005/0059165 | A9 | 3/2005 | Davis et al. |
| 2005/0099621 | A1 | 5/2005 | Vaez-Iravani et al. |
| 2005/0109396 | A1 | 5/2005 | Zucchelli et al. |
| 2005/0272142 | A1* | 12/2005 | Horita ..................... 435/287.1 |
| 2005/0282266 | A1 | 12/2005 | Teng et al. |
| 2006/0186346 | A1 | 8/2006 | Wei |
| 2006/0199260 | A1 | 9/2006 | Zhang et al. |
| 2006/0211071 | A1 | 9/2006 | Andre et al. |
| 2006/0289787 | A1 | 12/2006 | Ohman et al. |
| 2006/0290934 | A1 | 12/2006 | Boekelman |
| 2007/0084279 | A1 | 4/2007 | Huang et al. |
| 2007/0252090 | A1 | 11/2007 | Van De Water et al. |
| 2007/0272039 | A1 | 11/2007 | Hermet et al. |
| 2008/0003649 | A1 | 1/2008 | Maltezos et al. |
| 2008/0176230 | A1 | 7/2008 | Owen et al. |
| 2008/0176755 | A1 | 7/2008 | Amundson et al. |
| 2008/0233011 | A1 | 9/2008 | Gundel et al. |
| 2009/0050209 | A1 | 2/2009 | Rautavuori |
| 2009/0176661 | A1 | 7/2009 | Harding et al. |
| 2010/0051124 | A1 | 3/2010 | Imran |
| 2010/0120164 | A1 | 5/2010 | Salafsky |
| 2010/0152066 | A1 | 6/2010 | Malik et al. |
| 2010/0184229 | A1 | 7/2010 | Haas et al. |
| 2010/0192706 | A1 | 8/2010 | Fairs et al. |
| 2010/0291588 | A1 | 11/2010 | McDevitt et al. |
| 2010/0321696 | A1 | 12/2010 | Malik et al. |
| 2011/0104026 | A1 | 5/2011 | Yoon et al. |
| 2011/0132870 | A1 | 6/2011 | Moles |
| 2011/0151577 | A1 | 6/2011 | Zhang et al. |
| 2011/0207137 | A1 | 8/2011 | Malik et al. |
| 2011/0207313 | A1 | 8/2011 | Lim et al. |
| 2011/0306120 | A1 | 12/2011 | Nicholls et al. |
| 2012/0003631 | A1 | 1/2012 | Yu et al. |
| 2012/0171759 | A1 | 7/2012 | Williams et al. |
| 2012/0180882 | A1 | 7/2012 | Malik et al. |
| 2013/0164754 | A1 | 6/2013 | Malik et al. |
| 2013/0183659 | A1 | 7/2013 | Link et al. |

FOREIGN PATENT DOCUMENTS

| | | | |
|---|---|---|---|
| JP | 2002-214225 | 7/2002 | |
| JP | 2012-100549 | 5/2012 | |
| WO | 00/21659 | 4/2000 | |
| WO | 2007/102713 | 9/2007 | |
| WO | WO 2009006933 A1 * | 1/2009 | ........ B01L 3/502707 |
| WO | 2011/005487 | 1/2011 | |

OTHER PUBLICATIONS

PCT Written Opinion mailed on Feb. 17, 2014 for PCT Application PCT/US2010/039389 filed on Jun. 21, 2010 in the name of California Institute of Technology et al.
Final Office Action mailed on Oct. 23, 2013 for U.S. Appl. No. 12/638,829, filed Dec. 15, 2009 in the name of Imran R. Malik et al.
PCT International Search Report mailed on Feb. 7, 2011 for PCT Application PCT/US2010/039389 filed on Jun. 21, 2010 in the name of California Institute of Technology et al.
PCT Written Opinion mailed on Feb. 7, 2011 for PCT Application PCT/US2010/039389 filed on Jun. 21, 2010 in the name of California Institute of Technology et al.
PCT International Search Report mailed on Feb. 3, 2014 for PCT Application PCT/US2013/068170 filed on Nov. 1, 2013 in the name of California Institute of Technology.
PCT Written Opinion mailed on Feb. 3, 2014 for PCT Application PCT/US2013/068170 filed on Nov. 1, 2013 in the name of California Institute of Technology.
PCT International Search Report mailed on Feb. 17, 2014 for PCT Application PCT/US2013/068171 filed on Nov. 1, 2013 in the name of California Institute of Technology.
PCT Written Opinion mailed on Feb. 17, 2014 for PCT Application PCT/US2013/068171 filed on Nov. 1, 2013 in the name of California Institute of Technology.
PCT International Search Report mailed on Feb. 6, 2014 for PCT Application PCT/US2013/068173 filed on Nov. 1, 2013 in the name of California Institute of Technology.
PCT Written Opinion mailed on Feb. 6, 2014 for PCT Application PCT/US2013/068173 filed on Nov. 1, 2013 in the name of California Institute of Technology.
PCT International Search Report mailed on Oct. 16, 2013 for PCT Application PCT/US2013/051461 filed on Jul. 22, 2013 in the name of California Institute of Technology.
PCT Written Opinion mailed on Oct. 16, 2013 for PCT Application PCT/US2013/051461 filed on Jul. 22, 2013 in the name of California Institute of Technology.
PCT International Search Report mailed Feb. 17, 2014 for PCT Application PCT/US2013/068169 filed on Nov. 1, 2013 in the name of California Institute of Technology.
PCT Written Opinion mailed Feb. 17, 2014 for PCT Application PCT/US2013/068169 filed on Nov. 1, 2013 in the name of California Institute of Technology.
PCT International Search Report mailed on Feb. 5, 2014 for PCT/US2013/068172 filed on Nov. 1, 2013 in the name of California Institute of Technology.
PCT Written Opinion mailed on Feb. 5, 2014 for PCT/US2013/068172 filed on Nov. 1, 2013 in the name of California Institute of Technology.

(56) References Cited

OTHER PUBLICATIONS

Notice of Allowance mailed on Feb. 28, 2014 for U.S. Appl. No. 13/947,469, filed Jul. 22, 2013 in the name of California Institute of Technology.
Notice of Allowance mailed on May 14, 2014 for U.S. Appl. No. 13/947,469, filed Jul. 22, 2013 in the name of California Institute of Technology.
PCT International Search Report mailed on Feb. 14, 2014 for PCT/US2013/068165 filed on Nov. 1, 2013 in the name of California Institute of Technology.
PCT Written Opinion mailed on Feb. 14, 2014 for PCT/US2013/068165 filed on Nov. 1, 2013 in the name of California Institute of Technology.
Final Office Action mailed on Jan. 24, 2014 for U.S. Appl. No. 12/638,829, filed Dec. 15, 2009 in the name of Imran R. Malik et al.
Final Office Action mailed on Oct. 23, 2012 for U.S. Appl. No. 12/638,829, filed Dec. 15, 2009 in the name of Imran R. Malik et al.
Non-Final Office Action mailed on Dec. 16, 2011 for U.S. Appl. No. 12/638,829, filed Dec. 15, 2009 in the name of Imran R. Malik et al.
Non-Final Office Action mailed on Oct. 3, 2013 for U.S. Appl. No. 12/638,829, filed Dec. 15, 2009 in the name of Imran R. Malik et al.
Restriction Requirement mailed on Oct. 20, 2011 for U.S. Appl. No. 12/638,829, filed Dec. 15, 2009 in the name of Imran R. Malik et al.
Final Office Action mailed on Oct. 10, 2012 for U.S. Appl. No. 12/820,104, filed Jun. 21, 2010 in the name of Imran R. Malik et al.
Non-Final Office Action mailed on Jun. 6, 2012 for U.S. Appl. No. 12/820,104, filed Jun. 21, 2010 in the name of Imran R. Malik et al.
Notice of Allowance mailed on Dec. 24, 2012 for U.S. Appl. No. 12/820,104, filed Jun. 21, 2010 in the name of Imran R. Malik et al.
Final Office Action mailed on Sep. 12, 2013 for U.S. Appl. No. 13/009,785, filed Jan. 19, 2011 in the name of Imran R. Malik et al.
Non-Final Office Action mailed on May 28, 2013 for U.S. Appl. No. 13/009,785, filed Jan. 19, 2011 in the name of Imran R. Malik et al.
Restriction Requirement mailed on Mar. 5, 2013 for U.S. Appl. No. 13/009,785, filed Jan. 19, 2011 in the name of Imran R. Malik et al.
Non-Final Office Action mailed on Nov. 26, 2013 for U.S. Appl. No. 13/407,644, filed Feb. 28, 2012 in the name of Imran R. Malik et al.
Restriction Requirement mailed on Sep. 17, 2013 for U.S. Appl. No. 13/407,644, filed Feb. 28, 2012 in the name of Imran R. Malik et al.
Final Office Action mailed on Apr. 24, 2014 for U.S. Appl. No. 13/407,644, filed Feb. 28, 2012 in the name of Imran R. Malik et al.
Notice of Allowance mailed on Aug. 8, 2014 for U.S. Appl. No. 13/407,644, filed Feb. 28, 2012 in the name of Imran R. Malik et al.
Non-Final Office Action mailed on Sep. 17, 2014 for U.S. Appl. No. 13/009,785, filed Jan. 19, 2011 in the name of Imran R. Malik et al.
Notice of Allowance mailed on Sep. 11, 2014 for U.S. Appl. No. 14/070,469, filed Nov. 1, 2013 in the name of Imran R. Malik et al.
El Rainina, "Micro-Fluidic (Lab-on-the-Chip) PCR Array Cartridge for Biological Screening in a Hand Held Device" Final Report for CRADA No. 264, Oct. 2010. 26 pages.
Notice of Allowance mailed on Dec. 3, 2014 for U.S. Appl. No. 14/070,469, filed Nov. 1, 2013 in the name of Imran R. Malik et al.
Non-Final Office Action mailed on Nov. 5, 2014 for U.S. Appl. No. 12/638,829, filed Dec. 15, 2009 in the name of Imran R. Malik et al.
Notice of Allowance mailed on Jan. 7, 2015 for U.S. Appl. No. 13/009,785, filed Jan. 19, 2011 in the name of Imran R. Malik et al.

* cited by examiner

FIG. 6

FLUIDIC DEVICES AND FABRICATION METHODS FOR MICROFLUIDICS

CROSS REFERENCE TO RELATED APPLICATIONS

The present application claims priority to U.S. Provisional Patent Application 61/426,664 titled "Fabrication Method for Microfluidics with Minimum Adhesive Exposure to Fluids" filed on Dec. 23, 2010, which is herein incorporated by reference in its entirety.

FIELD

The present disclosure relates to fluidic or microfluidic devices and to methods to fabricate microfluidic or fluidic devices.

BACKGROUND

Microfluidic devices and fluidic devices are often attached on supporting substrates or apparatuses. Adhesive bonding has been used extensively but it still remains cumbersome, expensive and time consuming for microfluidic devices and fluidic devices having complex design of channels and reservoirs. Especially when the structures are very small, there is a significant problem of clogging the channels.

SUMMARY

According to a first aspect of the disclosure, a method of fabricating a fluidic device is described, the method comprising: providing a fluidic device including a body having a surface and one or more channels located in the body and defining recesses on said surface, the one or more channels having respective boundaries; forming a layer of adhesive including one or more panel-shaped pieces having a pattern based on the pattern of boundaries of the channels; and applying the layer of adhesive on the surface and controlling the layer of adhesive has respective boundaries surrounding the boundaries of the one or more channels.

According to a second aspect of the present disclosure, a fluidic device is described, the device comprising: a body having a surface and one or more channels located in the body and defining one or more recesses on said surface, the one or more channels having respective boundaries; and a layer of adhesive placed on the surface, wherein the layer of adhesive includes one or more panel-shaped pieces having a pattern which is based on the pattern of boundaries of the one or more recesses.

Further aspects of the disclosure are shown in the specification, drawings, and claims of the present application.

DETAILED DESCRIPTION

With reference to the enclosed figures, a microfluidic device (10), or microchip, for example a diagnostic cartridge, can include a main solid body or block (12). The block (12) can include a flat surface (16) and two fluid inlet or outlet ports (17), which can be located on a first side (19) of the block (12). On the flat surface (16), e.g., on an exposed surface of the block (12), the microfluidic device (10) can include fluid channels (13), (14), (15), and more in particular, two end channels (13), (15), which can be partially embedded in the flat surface (16) and partially embedded in the ports (17), and a reservoir/cavity (14), which can be located between and fluidly connected to the two end channels (13) (15). The reservoir (14) can be defined with the two end channels (13) (15), and more in particular with respective inlet mouths of the channels (13) (15), open recesses or cavities on the external surface (16), having respective boundaries.

According to an aspect of the present disclosure, the microfluidic device (10) can include a layer of adhesive (30), which can be structurally independent from the block (12) and can be applied on the external surface (16). The layer of adhesive (30) can be designed a priori based on the design of the channels of the body (12). In particular, the layer of adhesive (30) can include one or more panel-shaped pieces having a pattern (with respective boundaries) which can match, correspond or be based on the pattern of boundaries of the channels or cavities of the external surface (16). In other words, the layer of adhesive (30) can include one or more thin structures matching with the boundaries of the channels, without clogging the channels. The adhesive can be applied in various ways known to those having ordinary skill in the art. In the shown examples, the layer of adhesive includes one or more substantially annular-shaped flat pieces.

In particular, a very thin layer of adhesive, previously designed, can be deposited on the exposed surface (16). FIGS. 1-6 show possible plate patterns for application of adhesive and respective layers of adhesive. The adhesive can be applied on flat metal plate, separated from the cartridge/block (12) or on a plastic part. Eventually different surfaces of the fluidic device can be bonded to the substrates by the same technique and by changing adhesives if needed. The adhesive thickness can vary (e.g., few microns thick).

Figure 1:
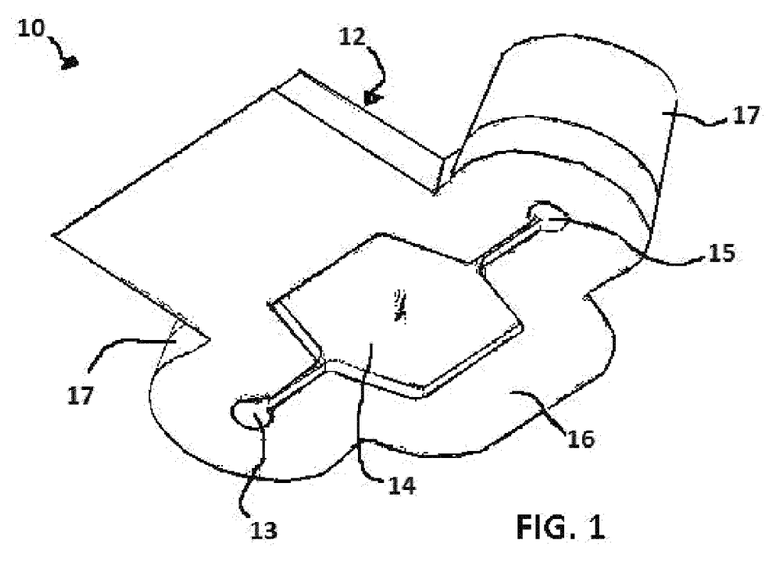
FIG. 1 shows a perspective view of an exemplary fluidic device.
Figure 2:
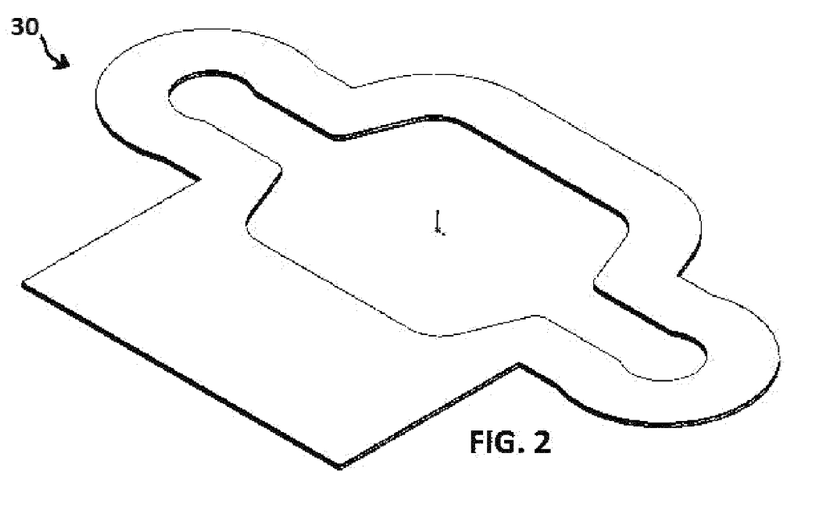
FIG. 2 shows a layer of adhesive according to an aspect of the present disclosure.
Figure 3:
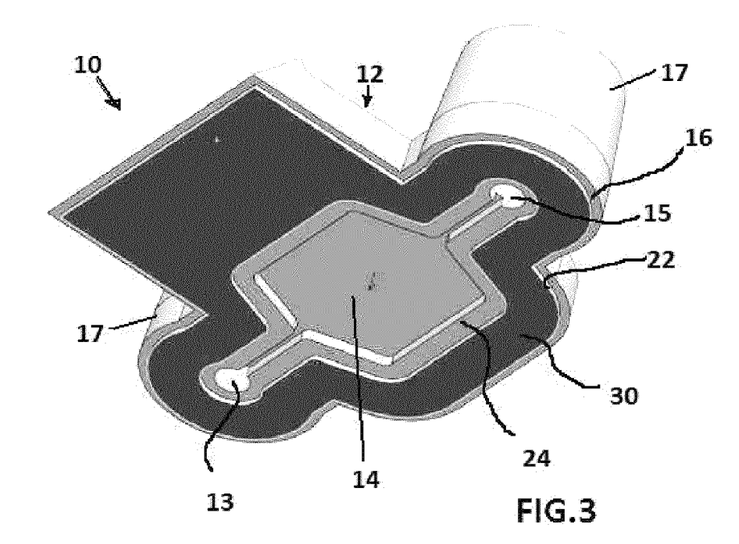
FIG. 3 shows a perspective view of a fluidic device according to an embodiment of the present disclosure.
Figure 4:
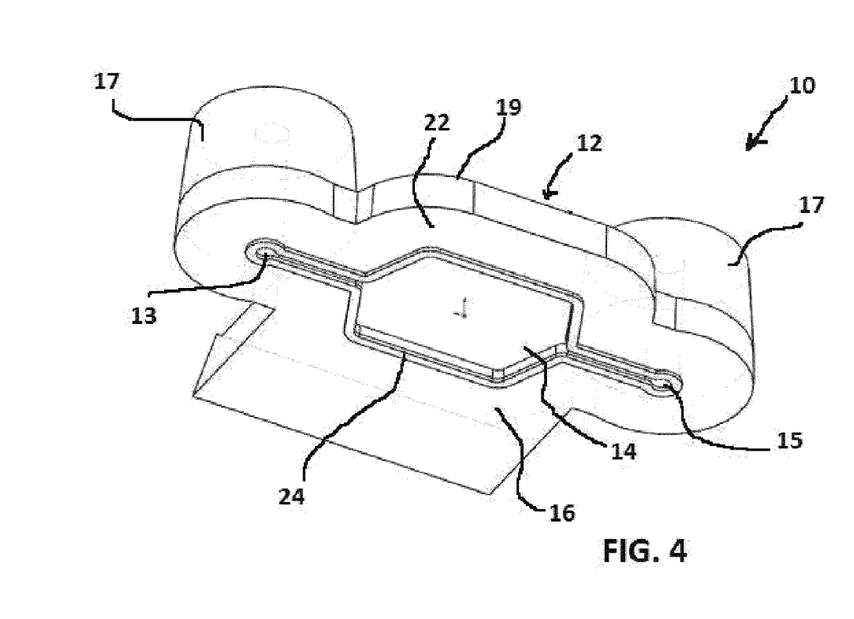
FIG. 4 shows a perspective view of a fluidic device according to an embodiment of the present disclosure.
Figure 5:
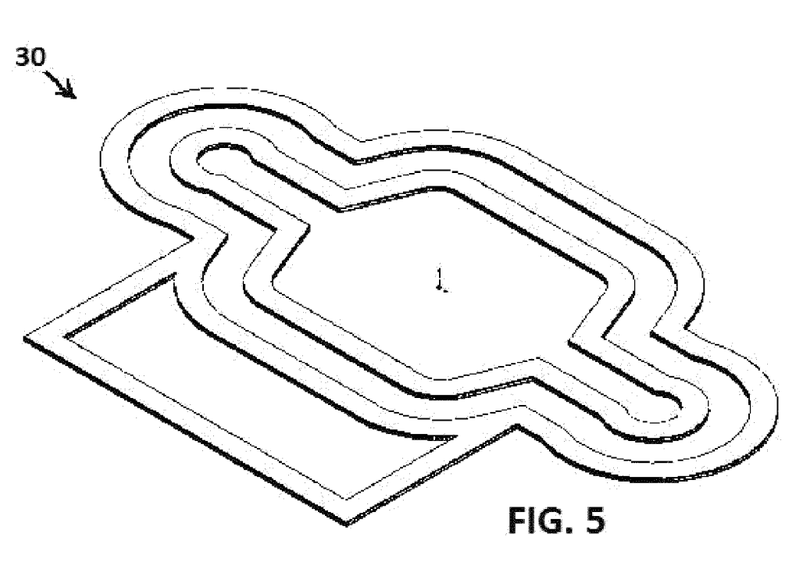
FIG. 5 shows a layer of adhesive according to an aspect of the present disclosure.

According to further aspects of the present disclosure, almost no adhesive (30) comes in direct contact with fluid passing through the channels (13), (14) and (15). In many cases, it can decouple adhesive chemical compatibility from the fluids in the microfluidic devices. This can be achieved from making very fine protrusions (24) (for example, few microns in some cases or less) which can protrude from the surface (16). Such structures can be readily made using various techniques including injection molding. FIG. 4 shows a fluidic device including the protrusions (24). Applying adhesive (using pad printing or otherwise like from a dispensing robot) to outside of protrusion (24) allows bonding of the cartridge while not allowing any/minimum interaction of fluid and the adhesive. In other words, according to a further aspects of the present disclosure, in order to delimit and confine the layer of adhesive (30), the external surface (16) of the block (12) can have etched or depressed regions (22) made around the end channels (13) (15) and/or the reservoir (14). Such etched regions can define respective protruding walls or protrusions (24) which protrude from the external surface (16) and can be located along the end channels (13) (15) and/or the reservoir (14). The etched or depressed regions (22) are able to receive or accommodate or house a layer of adhesive (30) and have pattern corresponding to the pattern of the layer of adhesive (30).

According to further embodiments of the present disclosure, the layer of adhesive (30) can be cut or deposited in such a manner that a small offset can be left between boundaries of channels (13) (14) and (15) and the pattern of the layer of adhesive (30). In particular, after deposition of the adhesive, a pressure can be applied on the adhesive to obtain the layer. An amount of adhesive can be previously accurately calculated to obtain said small offset and a defined thickness of the adhesive. Application of pressure can allow small flow of adhesive but it can stop due to fluidic effects and could form very sharp and well defined boundary mating with channel and reservoir boundaries. In some cases a very slight pressure might be needed due to the already thin layer of adhesive. This process can be very fast, economical and repeatable. While many other techniques to apply adhesive can fill the whole space except for the areas where fluids are to be moved, this methods of the present disclosure can allow controlled modifications of the adhesive so that channels are sealed without clogging, while minimizing use of adhesive supplies.

Figure 6:
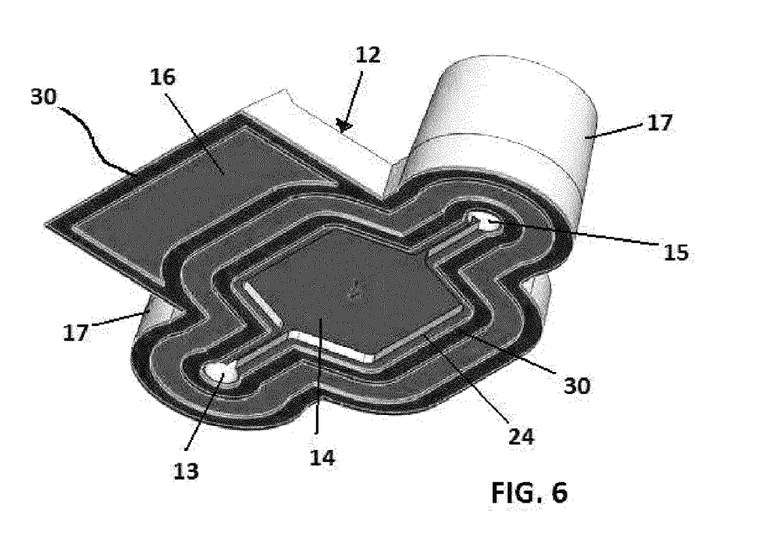
FIG. 6 shows a perspective view of a fluidic device according to an embodiment of the present disclosure.

With reference to FIG. 6, a cartridge according to a further embodiment of the present disclosure is shown. The cartridge of FIG. 6 includes a layer of adhesive (30) which can partially overlap the external surface (16) and provide selective bonding regions. In particular, such application can allow thermal guards to be automatically built in microfluidic structures (e.g., PCR reactors). In fact, air can be trapped in between adhesive layers and can then act as an insulator so that heat transfer in lateral dimension along adhesive is reduced.

For example, one can use the same technique for application of thermal or other epoxy on a large area with less thickness. Thus thermal epoxy using this technique to bond metal plate bottom with polymer (for example kapton) backed heater for qPCR can be applied. Also for two part epoxies, one can have a two color pad printing style application in which the areas of application overlap. Due to very small thickness, the mixing should be sufficient for mixing and curing. UV adhesives can also be used as well as many other kinds.

According to further aspects of the present disclosure, a method to create adhesive layers is disclosed. In particular, adhesive of various viscosities can be applied using dispensers, robots, pad printing, screen printing and other techniques, to obtain an adhesive layer. The obtained layer can be non-uniform due to surface tension and other effects. By applying a known pressure, the adhesive (which can flow) can make a uniform layer. The layers can automatically form a pattern due to fluidic physics. The thin adhesive layer reaches the boundary. This makes deposition of thin layers on large substrates extremely efficient, low cost and quick. Therefore, according to an aspect of the present disclosure, forming a layer of adhesive is applying known amount of adhesive and then applying pressure in a controlled manner to form a uniform layer.

According to further aspects of the present disclosure, the surface of the chip can be flat but the protrusions can be made in the sealing structure (e.g., flat metal of polymer surface). In that case the metal surface can be milled, etched, stamped or modified to make the protrusions or recesses.

The examples set forth above are provided to give those of ordinary skill in the art a complete disclosure and description of how to make and use the embodiments of the disclosure, and are not intended to limit the scope of what the inventors regard as their disclosure. Modifications of the above-described modes for carrying out the disclosure may be used by persons of skill in the art, and are intended to be within the scope of the following claims. All patents and publications mentioned in the specification may be indicative of the levels of skill of those skilled in the art to which the disclosure pertains. All references cited in this disclosure are incorporated by reference to the same extent as if each reference had been incorporated by reference in its entirety individually.

It is to be understood that the disclosure is not limited to particular methods or systems, which can, of course, vary. It is also to be understood that the terminology used herein is for the purpose of describing particular embodiments only, and is not intended to be limiting. As used in this specification and the appended claims, the singular forms "a," "an," and "the" include plural referents unless the content clearly dictates otherwise. The term "plurality" includes two or more referents unless the content clearly dictates otherwise. Unless defined otherwise, all technical and scientific terms used herein have the same meaning as commonly understood by one of ordinary skill in the art to which the disclosure pertains.

A number of embodiments of the disclosure have been described. Nevertheless, it will be understood that various modifications may be made without departing from the spirit and scope of the present disclosure. Accordingly, other embodiments are within the scope of the following claims.

The invention claimed is:

1. A method of fabricating a fluidic device, the method comprising:
   providing a fluidic device including a body having a surface and one or more channels located in the body and defining recesses on said surface, the one or more channels having respective boundaries, wherein the one or more channels are continuously open to the surface;
   providing the body with protruding walls that protrude from said surface and continuously surround the one or more channels at the boundaries of the one or more channels;
   forming a layer of adhesive including one or more panel-shaped pieces having a pattern based on a pattern of the boundaries of the one or more channels; and
   applying the layer of adhesive on the surface by using a known amount of adhesive, and controlling that the layer of adhesive has respective boundaries surrounding the boundaries of the one or more channels by applying pressure in a controlled manner to form a uniformly applied adhesive layer, wherein the protruding walls separate the layer of adhesive from the one or more channels.

2. The method of claim 1, wherein the controlling the layer of adhesive has respective boundaries surrounding the boundaries of the one or more channels is controlling an offset defined among the boundaries of the layer of adhesive and the boundaries of the one or more channels.

3. The method of claim 1, wherein the surface comprises depressed regions which accommodate the layer of adhesive and define said protrusions, said protrusions being able to avoid contact between the layer of adhesive and fluid passing through the one or more channels.

4. The method of claim 1, wherein the layer of adhesive is formed in such a manner that a small offset is left between the boundaries of the channels and the boundaries of the layer of adhesive.

5. The method of claim 1, wherein the layer of adhesive is applied only on selective zones of the surface and defines thermal guards for a fluid passing through the one or more channels.

6. The method of claim 1, wherein different layers of adhesive are applied on the surface.

\* \* \* \* \*